United States Patent Office 3,778,372
Patented Dec. 11, 1973

3,778,372
LUBRICANTS AND FUELS CONTAINING NITROGEN-BEARING COMPOSITIONS
John P. Murphy, Willoughby, Ohio, assignor to The Lubrizol Corporation, Wickliffe, Ohio
No Drawing. Continuation-in-part of abandoned application Ser. No. 773,298, Nov. 4, 1968. This application Dec. 23, 1971, Ser. No. 211,771
Int. Cl. C10l 1/22; C10m 1/32
U.S. Cl. 252—51.5 A          22 Claims

ABSTRACT OF THE DISCLOSURE

This invention is directed to lubricants and fuels comprising nitrogen-containing compositions and more specifically to a process for preparing nitrogen-containing compositions particularly useful as rust-inhibitors for lubricants and fuels. The nitrogen-containing compositions are prepared by reacting effective amounts of at least one alkylene amine with formic acid or a formic acid-producing compound at a temperature of at least about 25° C.

---

This application is a continuation-in-part of copending application Ser. No. 773,298 filed on Nov. 4, 1968, and now is abandoned.

This invention relates to lubricants and fuels comprising nitrogen-containing compositions and to a process for preparing compositions which are particularly useful as rust-inhibitors for lubricants and fuels. More specifically, this invention relates to rust-inhibiting nitrogen-containing compositions and to a process for preparing same which comprises reacting at a temperature of at least about 25° C. an effective amount of at least one alkylene amine with formic acid and/or a formic acid-producing compound including, for example, the anhydride, salt, halide, ester, amide, etc., or a combination thereof. The nitrogen-containing compositions may be used either alone or in combination with various other known additives, e.g., dispersants, detergents, anti-oxidants, etc., in lubricating oils, fuels, etc.

It is generally known that during the operation of an internal combustion engine, for example, the motor oil deteriorates causing the formation of sludge, varnish, rust, etc., which ultimately interferes with the normal operation of the engine causing a malfunction and premature breakdown. To avoid these and other relative problems, various oil soluble dispersants, anti-oxidants, detergents and the like are being used as additives in lubricants, fuels, power-transmitting fluids, e.g., hydraulic fluids, etc. Although many of these materials have achieved widespread acceptance there still is need for additives which not only prevent deterioration but also inhibit corrosion and generally improve the performance characteristics of lubricants and fuels.

Accordingly, it is an object of this invention to provide nitrogen-containing compositions which may be used as rust-inhibitors for lubricants and fuels. It is another object of this invention to provide a process for preparing nitrogen-containing compositions which may be used as additives to inhibit corrosion and generally improve the performance of lubricants and fuels. It is another object of this invention to provide a process and the products obtained therefrom for preparing oil soluble nitrogen-containing compositions which may be used as rust-inhibitors either alone or in combination in normally liquid hydrocarbon fuels, lubricants, etc. It is still a further object of this invention to provide a process for preparing oil soluble nitrogen-containing compositions particularly effective, as rust-inhibitors, at comparatively low temperatures.

These and other objects of the invention can be accomplished by providing a process for preparing an oil soluble nitrogen-containing composition for inhibiting rust and corrosion in various lubricants and fuels. The process essentially comprises contacting and reacting at a temperature of at least 25° C. from about 0.5 to about 5.0 equivalents of at least one alkylene amine with about 1.0 equivalent of formic acid and/or a formic acid-producing compound. The formic acid-producing compounds that may be used for preparing the nitrogen-containing compositions of this invention include the various derivatives of formic acid which are capable of forming the acid, when reacted with one or more of the alkylene amines at about room temperature. The formic acid-producing compounds particularly useful for purposes of this invention are selected from the class consisting of the anhydride of formic acid, salts of formic acid, halides of formic acid, esters of formic acid, amides of formic acid, imides of formic acid, amidines of formic acid and various combinations thereof in any proportion.

The salts of formic acid, for example, may be obtained by reacting an amine, e.g., a low molecular weight amine or ammonia with the acid at a temperature of at least about 25° C. and preferably at a temperature ranging from about 25° C. to about 120° C. More specifically, an ammonia or a lower alkyl ammonia salt of formic acid, e.g., wherein the alkyl group has 1 to 12 carbon atoms, and the corresponding low molecular weight amides, imides or amidines may be used to prepare the nitrogen-containing compositions for purposes of this invention. Similarly, the esters of formic acid may be reacted with an alkylene amine, e.g., polyethylene polyamine, which may be obtained, for example, by esterifying formic acid with a low molecular weight alcohol, e.g., an aliphatic alcohol having 1 to about 12 carbon atoms. Similarly, the halides, e.g., a chloride or bromide, of formic acid may be used in place of formic acid or the anhydride thereof, etc. In addition, the amides of formic acid may be obtained by reacting a low molecular weight amine, e.g., an aliphatic amine having 1 to 12 carbon atoms, with formic acid or the anhydride thereof, etc., at temperatures ranging from about 80° C. up to about 300° C. to obtain the corresponding amide, imide, amidine or mixtures thereof depending upon the reaction conditions.

It is preferred, however, in preparing the oil soluble nitrogen-containing composition of this invention, to react the alkylene amine with either formic acid or a salt, ester or amide of formic acid. More specifically, the formic acid-producing compounds, e.g., the derivatives of formic acid, preferably, include the salts derived from either ammonia or a low molecular weight amine having up to 12 and preferably 1 to 8 carbon atoms. The esters are derived from alcohols including, for example, the lower molecular weight alkyl, cycloalkyl, aryl, alkylaryl or aralkyl alcohols wherein the number of carbon atoms range up to 12 carbon atoms and preferably from 1 to 8 carbon atoms. The amides are derived from various amines including the alkyl, cycloalkyl, aryl, alkylaryl or aralkyl amines wherein the number of carbon atoms range up to 12 and preferably from 1 to 8 carbon atoms. It is particularly preferred, however, to use the lower molecular weight derivatives, e.g., volatile derivatives of formic acid so that the alkylene polyamines may react with said derivatives at the stated temperatures to obtain the nitrogen-containing composition by displacing the volatile groups, e.g., the lower molecular weight amide, ester or salt groups, etc. The volatile constituents may be separated from the reaction mixture by methods known in the art and at temperatures utilized for preparing the products of this invention.

Specific examples of the various formic acid-producing compounds or derivatives that may be used include the ammonia salts, e.g., ammonia formate; the alkylammonia formates, e.g., methyl, ethyl, propyl, butyl formates, etc.; the esters of formic acid such as the lower alkyl esters, e.g., methyl formate, ethyl formate, propyl formate, butyl formate, octyl formate, etc. In addition, the amides include the amides derived from ammonia or the lower molecular weight alkyl amines such as formamide, dimethyl formamide, diethyl formamide, N-methyl formamide or other alkyl formamides wherein the alkyl group has from 1 to about 8 carbon atoms.

The nitrogen-containing compositions of this invention are prepared by contacting and reacting the formic acid or at least one formic acid-producing compound with at least one alkylene amine, e.g., alkylene polyamines at a temperature of at least about 25° C., e.g., 25° C. to 120° C. and preferably at a temperature of at least about 100° C. However, the reaction temperature may range from about 25° C. to about 300° C. and preferably from about 100° C. to about 250° C. When utilizing a volatile formic acid-producing compound, such as methyl formate, ethyl formate, or an ammonia salt, etc., loss of the reagent may be avoided by a dropwise addition of the acid-producing compound to the alkylene amine.

The reaction may be carried out, preferably, in the presence of at least one substantially inert organic liquid which may be present in an amount ranging up to about 80% by weight of the total composition and preferably in an amount of about 10% to 50% by weight of the composition. These organic diluents or solvents are well known and include, for example, various organic liquids such as mineral oil, Stoddard Solvent, the aliphatic, cycloaliphatic and aromatic hydrocarbons, substituted hydrocarbons and the corresponding halogenated hydrocarbons. Specifically, the organic liquids comprise, for example, one or more solvents including a combination of mineral oil with one or more aliphatic, cycloaliphatic or aromatic hydrocarbons including kerosene, benzene, toluene, naphtha, xylene, ethyl benzene, propyl benzene, cumene, fluorobenzene, chlorobenzene, bromobenzene, toluene, heptene, octene, decane, trimethyl pentane, cyclohexane, cycloheptane, ethyl cyclohexane, cyclooctane, etc.

The alkylene amines, e.g., polyalkylene polyamines, which may be used to obtain the nitrogen-containing compositions of this invention include various amines which may be characterized, for example, by the formula:

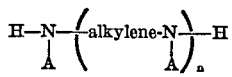

when $n$ is an integer preferably less than about 10, e.g., 2 to 6, A is hydrogen or a substantially hydrocarbon radical and the alkylene radical is preferably a lower alkylene radical having less than about 10 carbon atoms, e.g., 2 to 8 carbon atoms. Specifically, the alkylene amines may include, for example, methylene amines, ethylene amines, butylene amines, propylene amines, pentylene amines, hexylene amines, heptylene amines, octylene amines, the polymethylene amines, the cyclic and higher homologs of these amines including, for example, the piperazines, the amino-alkyl-substituted piperazines, etc. The amines may be exemplified, further, to include ethylene diamine, triethylene tetramine, propylene diamine, decamethylene diamine, octamethylene diamine, di(heptamethylene)triamine, dipropylene tetramine, tetraethylene pentamine, trimethylene diamine, pentaethylene hexamine, di(trimethylene)triamine, 2 - heptyl - 3 - (2 - aminopropyl) imidazoline, 4 - methylimidazoline, 1,3 - bis(2 - aminoethyl) imidazoline, pyrimidine, 1 - (2 - aminopropyl)piperazine, 1,4 - bis(2 - aminoethyl)piperazine, 2 - methyl-1-(2-aminobutyl)piperazine, etc. In addition, other amines which may be used, for example, include the higher homologs which may be prepared by condensing two or more of the above-mentioned alkyl amines in a conventional manner.

The ethylene amines are preferred and are described in detail under the heading "Ethylene Amines" in the Encyclopedia of Chemical Technology, by Kirk and Othmer, volume 5, pages 898–905, Interscience Publishers, New York (1950). These compounds may be prepared conveniently by the reaction of an alkylene chloride with ammonia which may result in a mixture of alkylene amines including the cyclic condensation products such as the piperazines. The amine mixtures are particularly useful for purposes of this invention. In addition to the mixture of amines, the pure alkylene amines may be used also for purposes of this invention. For example, a particularly useful alkylene amine, for reasons of economy as well as effectiveness of the products derived therefrom, comprises a mixture of ethylene amines prepared by the reaction of ethylene chloride with ammonia. This reaction results in an amine composition that corresponds to tetraethylene pentamine.

The amines, for purposes of this invention, may have primary, secondary, and if desired, some tertiary amine groups. The reaction of formic acid or its derivative with the tertiary amine groups results in the formation of a salt and it is not known if the remaining reaction takes place, preferentially, at the secondary or primary amine groups. However, the composition of the nitrogen-containing compounds of this invention, depends upon the alkylene amine used in the reaction with the formic acid or its derivative and the conditions under which said reaction takes place, e.g., temperatures ranging from about 25° C. to 120° C. or up to about 300° C. Thus, depending upon the reaction conditions, e.g., temperatures, etc., the resulting nitrogen-containing composition may comprise a salt, amide, imide, amidine, etc., and various mixtures thereof, all of which are useful as rust-inhibitors for purposes of this invention.

In preparing the nitrogen-containing compositions, the formic acid or its derivative, e.g., a low molecular weight salt, amide or ester is reacted with the alkylene amine, e.g., polyethylene polyamine, at a temperautre of at least about 25° C. and in amounts ranging from approximately 0.5 equivalent to about 5.0 equivalents, e.g., 1.0 to about 5.0 and preferably from about 0.5 and less than 3.0 equivalents, e.g., approximately 1.0 to 2.5 equivalents of at least one alkylene amine for each 1.0 equivalent of formic acid or a derivative thereof. The equivalent weight of the alkylene amine is determined by the number of reactive amine groups and may be calculated, for example, by dividing the molecular weight of the amine by the number of said amine groups. Similarly, the equivalent weight of formic acid or a formic acid-producing compound is determined by dividing the molecular weight of the acid by the number of acid or acid-producing groups present, e.g., the equivalent weight of formic acid is the same as its molecular weight.

The following illustrate the process and products obtained therefrom for preparing the nitrogen-containing compositions for purposes of this invention.

EXAMPLE 1

Approximately 820 parts by weight (20 equivalents) of a commercial tetraethylene pentamine having 34.2% nitrogen is added at a temperature of about 65° C. to approximately 460 parts by weight (10 equivalents) of formic acid. External cooling is applied to maintain the temperature between 65°–95° C. during the addition. The temperature is raised to about 150° C. and a slow stream of nitrogen is passed through the reaction mixture to aid the removal of water. The temperature is gradually raised to 160° C. and held there until the distillation of water has ceased. Approximately 1096 parts by weight of the product are obtained and found to have a nitrogen content of 25.3%.

EXAMPLE 2

To approximately 820 parts by weight of a commercial tetraethylene pentamine having a nitrogen content of about 34.2% is added to about 920 parts by weight (20 equivalents) of formic acid at a temperature of about 60°–85° C. The temperature is raised to about 120° C. and a slow stream of nitrogen is passed through the reaction mixture as the temperature is slowly raised to about 150° C. The reaction temperature is held at a temperature of about 150° C. until the distillation of water has ceased. Approximately 1372 parts by weight of product are obtained and found to have a nitrogen content of about 19.7%.

EXAMPLE 3

Approximately 185 parts by weight (4.5 equivalents) of a commercial polyethylene polyamine having an average composition corresponding to that of tetraethylene pentamine is heated to a temperature of about 90° C. and then approximately 69 parts by weight (1.5 equivalents) of formic acid is slowly added to the reaction which raises the temperature to about 125° C. A slow stream of nitrogen is passed through the reaction mixture as the temperature raises to about 150° C. and held at a temperature of about 150–160° C. until the distillation of water is completed. The resulting product comprised 217 parts by weight and found to have a nitrogen-content of about 26.1%.

EXAMPLE 4

Approximately 824 parts by weight (20 equivalents) of a commercial polyethylene polyamine having an average composition corresponding to that of tetraethylene pentamine is added to approximately 460 parts by weight (10 equivalents) of formic acid at a temperature of about 78°–95° C. The reaction mixture is then heated to about 150° C. while a stream of nitrogen is passed through the mixture. The temperature is held at 150°–160° C. until the distillation of water is completed. Approximately 1102 parts by weight of product are obtained and found to have a nitrogen content of about 25.6%.

EXAMPLE 5

Approximately 824 parts by weight (20 equivalents) of a commercial polyethylene polyamine having an average composition corresponding to that of tetraethylene pentamine is added to about 920 parts by weight (20 equivalents) of formic acid at temperatures of about 78°–93° C. The reaction mixture is then held at 150° C. while a slow stream of nitrogen is passed through said mixture. The temperature is held at a temperature of about 150°–158° C. until the distillation of the water is completed. Approximately 1239 parts by weight of product are obtained and found to have a nitrogen content of about 20%.

EXAMPLE 6

A reaction mixture comprising approximately 7.5 equivalents of a polyethylene pentamine and about 1.5 equivalents of formic acid is heated to a temperature of about 75° C. Subsequently, the reaction temperature is raised to about 150° C. while blowing with nitrogen to aid in the removal of water. The reaction temperature is gradually raised to about 180° C. until the water is removed and the product is obtained.

EXAMPLE 7

A reaction mixture comprising an organic solvent together with about 40 equivalents of a polyalkylene tetramine and about 20 equivalents of a methyl ester of formic acid is heated to a temperature of about 65°–75° C. The temperature is subsequently raised to about 150° C. while blowing with nitrogen to aid in the removal of byproduct. The temperature is gradually raised to about 225° C. and held at this temperature until the by-products are removed. Approximately 2000 parts by weight of product are obtained.

EXAMPLE 8

A reaction mixture comprising approximately 4.0 equivalents of a polyalkylene tetraamine and approximately 2.0 equivalents of formamide is heated to a temperature of about 65° C. The temperature is subsequently increased to about 95°–100° C. and then to about 150° C. while blowing with nitrogen to aid in the removal of the by-product formed during the reaction. The temperature is gradually raised to about 200° C. and held there until the by-product is removed. Approximately 200 parts by weight of product are obtained.

EXAMPLE 9

A reaction mixture comprising an organic diluent and approximately 10 equivalents of a polyethylene pentamine and approximately 12 equivalents of methyl-ammonia formate is heated to a temperature of about 80° C. The temperature is subsequently raised to about 160° C. while blowing with nitrogen to aid in the removal of the by-product formed during the reaction. The temperature is held at about 200°–220° C. until the by-product is substantially removed. Approximately 550 parts by weight of product are obtained.

EXAMPLE 10

A reaction mixture comprising approximately 10 equivalents of a polyalkylene triamine and approximately 7.5 equivalents of an alkyl formamide is heated to temperatures ranging up to about 80° C. The temperature is subsequently raised to about 180° C. while blowing with nitrogen to aid in the removal of the by-product formed during the reaction. The temperature of the reaction is held at about 180° C. until the by-product is removed. Approximately 700 parts by weight of product are obtained.

EXAMPLE 11

A reaction mixture comprising approximately 10 equivalents of a polyethylene pentamine and about 5 equivalents of an ammonia salt of formic acid is heated to a temperature of about 65°–75° C. Subsequently, the reaction temperature is raised to about 150° C. while blowing with nitrogen to aid in the removal of by-product. The reaction temperature is gradually raised to about 160°–200° C. until the by-product is removed. Approximately 600 parts by weight of product are obtained.

EXAMPLE 12

Approximately 3.75 equivalents of a commercial polyethylene polyamine having an average composition corresponding to that of tetraethylene pentamine is heated to a temperature of about 90° C. and then approximately 69 parts by weight (1.5 equivalents) of formic acid is slowly added to the reaction which raises the temperature to about 125° C. A slow stream of nitrogen is passed through the reaction mixture as the temperature raises to about 150° C. and held at a temperature of about 150°–160° C. until the distillation of water is completed. The resulting product is found to have a nitrogen-content of about 22%.

The nitrogen-containing compositions of this invention may be used as an additive, e.g., particularly as a rust-inhibiting composition in various hydrocarbon fuels including, for example, gasolines, diesel fuels, furnace oils and other normally liquid petroleum distillates. In addition, the nitrogen-containing compositions are useful as additives for lubricating compositions including a diverse number of oils of lubricating viscosity such as the natural or synthetic lubricating oils. More specifically, the nitrogen-containing compositions of this invention may be used as an additive to improve the rust-inhibition of various lubricants, for spark-ignited and combustion-ignited internal combustion engines such as the automobile and truck engines, 2-cycle engines, aviation piston engines, marine and railroad diesel engines and the like. In addition, various automatic transmission fluids, trans-axle lubricants, gear lubricants, metal-working lubricants, hydraulic fluids and similar lubricating oil-containing and grease compositions can be improved by the incorporation therein of a small but effective amount of the nitrogen-containing composition of this invention.

More specifically, the nitrogen-containing additives of this invention may be used in various lubricating oils and fuels in amounts ranging from about 0.0001% up to about 25% or 30% by weight of the total composition. Preferably, however, the nitrogen-containing composition may be used in amounts ranging from about 0.001% to about 20% or 0.01% to about 20% by weight in various lubricants, e.g., mineral oils, and from about 0.0001% to about 2.0% or 0.001% to about 1.0% by weight in various fuels. The optimum amount to be added to a particular oleaginous material, however, will depend upon the conditions the fuel or lubricant is to be subjected. More specifically, for example, if the nitrogen-containing additives are to be used in a fuel or oil for an internal combustion engine, the amount may range from about 0.001% to about 1.0% by weight and usually in amounts ranging from about 0.03% to 0.5% by weight or in amounts ranging from about 0.005% to about 0.008% by weight.

The following illustrate the use of the nitrogen-containing compositions of this invention as an additive for lubricants and fuels.

EXAMPLE A

SAE 30 mineral lubricating oil is blended with 0.165% sulfate ash as a carbonated basic calcium salt of a $C_{14}$–$C_{18}$ alkyl salicylic acid, 0.77% of phosphorus as the zinc salt of phosphorothioic acid prepared by the reaction of 1 mole of phosphorus pentasulfide with a mixture of 2.6 moles of isobutyl alcohol and 1.4 moles of primary amyl alcohol, 1.69% of the amide of polyisobutenyl (average molecular weight of about 850) succinic acid and tetraethylene pentamine and 34 parts per million of the product obtained from Example 3 of this invention.

EXAMPLE B

SAE 10W–40 mineral lubricating oil is blended with 2.94% by weight of a composition prepared by reacting polyisobutenyl (average molecular weight of 850) succinic anhydride with the reaction product of 2 moles of (hydroxyethyl) ethylene diamine with 1.0 mole of adipic acid, 0.575% by weight of a carbonated basic calcium salt of a polydodecyl benzene sulfonic acid and 60 parts per million of the product obtained from Example 3 of this invention.

EXAMPLE C

Gasoline for an internal combustion engine is blended with 0.005% by weight of the product obtained from Example 3 of this invention.

EXAMPLE D

A diesel fuel is blended with approximately 1.0% by weight of the product obtained from Example 1 of this invention.

EXAMPLE E

A fuel containing kerosene is blended with approximately 2.0% by weight of the product obtained from Example 2 of this invention.

EXAMPLE F

A hydraulic fluid containing mineral lubricating oil is blended with approximately 0.1% by weight of the product obtained from Example 4 of this invention.

In addition to the nitrogen-containing compositions of this invention it is obvious that other known additives may be used either alone or in combination in the lubricants and fuels. These additives may include, for example, detergents of the ash-containing type, dispersants of the ashless-type, viscosity index improving agents, pour-point depressing agents, anti-foam agents, extreme-pressure agents, other rust-inhibiting agents, oxidation and corrosion inhibition agents and various mixtures of these materials in various proportions as illustrated, for example, in U.S. Patents 3,381,022; 3,509,052; 3,272,746; 3,172,892; 3,374,174; etc. More particularly, the ash-containing detergents may be illustrated by the oil soluble neutral and basic salts of the alkali or alkaline earth metals of the sulfonic acids, carboxylic acids or the organic phosphorus acids. An additive may be prepared, for example, by the reaction of an olefin polymer, e.g., polyisobutene, having a molecular weight of about 2000 with a phosphorizing agent including, for example, phosphorus trichloride, phosphorus heptasulfide, phosphorus pentasulfide, phosphorus trichloride and sulfur, white phosphorus and a sulfur halide or phosphorothioic chloride. The compositions most commonly used, however, are the salts of sodium, potassium, lithium, calcium, magnesium, strontium, barium and various mixtures thereof.

An example for preparing the basic salts, comprises heating a mineral oil solution of the acid with a stochiometric excess of a metal neutralizing agent, e.g., a metal oxide, hydroxide, carbonate, bicarbonate, sulfide, etc., at temperatures above about 50° C. In addition, various promoters may be used in the neutralizing process to aid in the incorporation of the excess of metal. These promoters are presently known and include compounds as the phenolic compounds, e.g., phenols, naphthols, alkylphenols, thiophenols, sulfurized alkylphenols and the various condensation products of formaldehyde with the phenolic compounds, e.g., alcohols such as methanol, 2-propanol, octyl alcohol, Cellosolve, Carbitol, ethylene glycol, stearyl alcohol and cyclohexyl alcohol; amines such as aniline, phenylene-diamine, phenothiazine, phenyl-beta-naphthylamine and dodecyl amine, etc. A particularly effective process for preparing the basic salts comprises mixing the acid with an excess of the alkaline earth metal in the presence of the phenolic promoter and a small amount of water and carbonating the mixture at an elevated temperature, e.g., 60° C. to about 200° C.

The extreme pressure agents, corrosion-inhibiting and oxidation inhibiting agents are exemplified by the chlorinated aliphatic hydrocarbons such as chlorinated wax; organic sulfides and polysulfides such as benzyl disulfide, bis(chlorobenzyl) disulfide, dibutyl tetrasulfide, sulfurized sperm oil, sulfurized methyl ester of oleic acid, sulfurized alkylphenol, sulfurized dipentene, sulfurized terpene, etc.; phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dipentyl phenyl phosphite, tridecyl phosphite, distearyl phosphite, dimethyl naphthyl phosphite, oleyl-4-pentyl phenyl phosphite, polypropylene(molecular weight 500)-substituted phenyl phosphite, diisobutyl substituted phenyl phosphite; metal thiocarbamates such as zinc dioctyldithiocarbamate and barium heptylphenyl dithiocarbamate; Group II metal phosphorodithioates such as the barium, calcium, cadmium and zinc dicyclohexylphosphorodithioate, zinc dioctylphosphorodithioate, the zinc salt of a phosphorodithioic acid produced by the reaction of phosphorus pentasulfide with an equimolar mixture of isopropyl alcohol and n-hexyl alcohol, etc.

The fuel or lubricating compositions may contain other metal detergent additives in amounts ranging from about 0.001% to about 15% by weight. In some applications, e.g., in lubricating marine diesel engines, the lubricating compositions may contain as much as 30% of a detergent additive. The compositions, e.g., lubricants or fuels, etc., may contain extreme pressure agents, viscosity-index improving agents, pour-point depressing agents, etc., each in amounts within the range of from about 0.001% to 15% and preferably in amounts of 0.1% to about 10%. One or more of the above-mentioned additives may be used either alone or in combination in various compositions, e.g., fuels or lubricating oils, with about 0.0001% to about 30% by weight of the compositions of this invention.

The oleaginous materials, e.g., lubricants and fuels, include animal and vegetable oils, e.g., castor oil, lard oil, etc., as well as solvent-refined or acid-refined mineral lubricating oils of the paraffinic, naphthenic or mixed paraffinic-naphthenic types. Oils of lubricating viscosity derived from coal or shale are useful base oils. The synthetic lubricating oils include the hydrocarbon oils and halo-substituted hydrocarbon oils such as polymerized and interpolymerized olefins (e.g., polybutylenes, propylene-isobutylene copolymers, chlorinated polybutylenes, etc.); alkylbenzenes (e.g., dodecylbenzene, tetradecyl benzene, dinonylbenzene, di-(2-ethylhexyl) benzene, etc); polyphenyls (e.g., biphenyls, terphenyls, etc.) and the like. The alkylene oxide polymers and interpolymers and derivatives thereof where the terminal hydroxyl groups have been modified by esterification, etherification, etc., comprise another class of known synthetic lubricating oils. These are exemplified by the oils prepared by polymerization of ethylene oxide, propylene oxide, the alkyl and aryl ethers of these polyoxyalkylene polymers, e.g., methylpolyisopropylene glycol ether having an average molecular weight of 1000, diphenyl ether of polyethylene glycol having a molecular weight of 500 to 1000, diethyl ether of polypropylene glycol having a molecular weight of 1000 to 1500, etc., or mono- and polycarboxylic esters thereof, for example, the acetic acid esters, mixed $C_3$–$C_8$ fatty acid esters or the $C_{13}$Oxo acid diester of tetraethylene glycol, etc.

Other synthetic lubricating oils comprise the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of 2-ethyl hexanoic acid and the like.

Silicone-based oils such as the polyalkyl-, polyaryl-, polyalkoxy- or polyaryloxy- siloxane oils and silicate oils comprise another class of synthetic lubricants (e.g., tetraethyl-silicate, tetraisopropyl-silicate, tetra-(2 - ethylhexyl)-silicate, tetra-(4 - methyl - 2 - tetraethyl)-silicate, tetra-(p-tert-butylphenyl)-silicate, hexyl - (4 - methyl - 2-pentoxy)-disiloxane, poly(methyl)-disiloxanes, poly-(methylphenyl)-siloxanes, etc.). Other synthetic lubricants include the liquid esters of phosphorus-containing acids (e.g., tricresyl phosphate, trioctyl phosphate, diethyl ester of decane phosphonic acid, etc.), polymeric tetrahydrofurans and the like.

While this invention is described with a number of specific embodiments, it is obvious that there are other variations and modifications which can be made without departing from the spirit and scope of the invention as particularly set forth in the appended claims.

What is claimed is:

1. A composition comprising a major amount of lubricating oil or normally liquid fuel and an effective amount of a rust-inhibiting, nitrogen-containing composition; said nitrogen-containing composition prepared by reacting at a temperature of at least about 25° C., approximately 0.5 to about 5.0 equivalents of at least one alkylene amine with about 1.0 equivalent of formic acid or a formic acid-producing compound selected from the class consisting of the anhydrides of formic acid, salts of formic acid, esters of formic acid, halides of formic acid, amides of formic acid, imides of formic acid, amidines of formic acid and combinations thereof.

2. The composition of claim 1 further characterized in that the alkylene amine is present in an amount ranging from about 0.5 and less than 3.0 equivalents for each 1.0 equivalent of formic acid or a formic acid-producing compound.

3. The composition of claim 1 further characterized in that the alkylene amine is present in an amount ranging from about 1.0 to about 5.0 equivalents for each 1.0 equivalent of formic acid or a formic acid-producing compound selected from the class consisting of amides of formic acid, esters of formic acid and salts of formic acid.

4. The composition of claim 3 further characterized in that the alkylene amine is reacted with the formic acid or a formic acid-producing compound at a temperature of at least about 100° C.

5. The composition of claim 1 further characterized in that the alkylene amine is reacted with the formic acid or a formic acid-producing compound at a temperature ranging from about 25° C. to about 300° C.

6. The composition of claim 4 further characterized in that at least one alkylene amine is reacted with formic acid.

7. The composition of claim 2 further characterized in that at least one alkylene amine is reacted with a $C_1$–$C_{12}$ aliphatic alcohol ester of formic acid.

8. The composition of claim 7 further characterized in that the ester of formic acid is a low molecular weight alkyl ester wherein the alkyl group has from 1 to 8 aliphatic carbon atoms.

9. The composition of claim 1 further characterized in that the alkylene amine is reacted with a salt of formic acid.

10. The composition of claim 9 further characterized in that the salt of formic acid is an ammonia salt.

11. The composition of claim 9 further characterized in that the salt of formic acid is an amine salt of a $C_1$–$C_{12}$ alkyl amine.

12. The composition of claim 2 further characterized in that the alkylene amine is reacted with an amide of formic acid.

13. The composition of claim 12 further characterized in that the amide of formic acid is derived from a $C_1$–$C_{12}$ aliphatic amine.

14. The composition of claim 13 further characterized in that the low molecular weight amine has 1 to 8 aliphatic carbon atoms.

15. The composition of claim 2 further characterized in that the alkylene amine is an ethylene polyamine.

16. The composition of claim 6 further characterized in that the alkylene amine comprises a mixture of polyethylene polyamines.

17. The composition of claim 1 further characterized in that the alkylene amine is a polyethylene polyamine.

18. The composition of claim 1 further characterized in that the rust-inhibiting nitrogen-containing composition is present in the lubricating oil or fuel in an amount ranging from about 0.0001% to 30% by weight of the composition.

19. The composition of claim 18 further characterized in that the lubricating oil contains from about 0.001% to 20% by weight of the rust-inhibiting nitrogen-containing composition.

20. The composition of claim 18 further characterized in that the fuel contains from about 0.0001% to 2.0% by weight of the rust-inhibiting nitrogen-containing composition.

21. The composition of claim 1 further characterized in that the fuel is a hydrocarbon fuel comprising a normally-liquid petroleum distillate and about 0.001% to 1.0% by weight of the rust-inhibiting nitrogen-containing composition.

22. The composition of claim 4 further characterized in that the fuel is a petroleum distillate.

References Cited

UNITED STATES PATENTS

| | | | |
|---|---|---|---|
| 3,609,076 | 9/1971 | Sabol | 252—34 X |
| 2,862,883 | 12/1958 | Hughes et al. | 252—34 X |
| 2,758,086 | 8/1956 | Stuart et al. | 252—34 X |
| 1,926,015 | 9/1933 | Rosenmund | 260—561 R |

PATRICK P. GARVIN, Primary Examiner

A. H. METZ, Assistant Examiner

U.S. Cl. X.R.

44—71; 252—34, 392

UNITED STATES PATENT OFFICE
CERTIFICATE OF CORRECTION

Patent No. 3,778,372  Dated December 11, 1973

Inventor(s) John P. Murphy

It is certified that error appears in the above-identified patent and that said Letters Patent are hereby corrected as shown below:

Claim 7, line 1 change "2" to --1--.

Claim 12, line 1 change "2" to --1--.

Claim 15, line 1 change "2" to --1--.

Signed and sealed this 16th day of April 1974.

(SEAL)
Attest:

EDWARD M. FLETCHER, JR.
Attesting Officer

C. MARSHALL DANN
Commissioner of Patents